United States Patent [19]

Massey et al.

[11] 4,087,074

[45] May 2, 1978

[54] SPRING RETURN VALVE ACTUATOR

[75] Inventors: Roger G. Massey, Exeter; David G. Holloway, Concord, both of N.H.

[73] Assignee: The Parker & Harper Mfg. Co., Inc., Worcester, Mass.

[21] Appl. No.: 745,367

[22] Filed: Nov. 26, 1976

[51] Int. Cl.² ............................................. F16K 31/163
[52] U.S. Cl. ................................... 251/58; 92/130 A; 92/63; 92/69 R
[58] Field of Search ................. 251/58; 92/63, 130 A, 92/69 R

[56] References Cited

U.S. PATENT DOCUMENTS

| 3,053,294 | 9/1962 | Andersson | 92/63 R |
| 3,508,469 | 4/1970 | Williams | 92/130 A |
| 3,712,178 | 1/1973 | Hensley | 92/63 X |

FOREIGN PATENT DOCUMENTS 2,508,683  2/1975  Germany ............................. 251/58

Primary Examiner—Arnold Rosenthal
Attorney, Agent, or Firm—Thomas N. Tarrant

[57] ABSTRACT

A fluid actuator for 90° rotating valves having a return spring coupled to an independent fluid actuated piston to assist in spring compression on the forward stroke.

4 Claims, 3 Drawing Figures

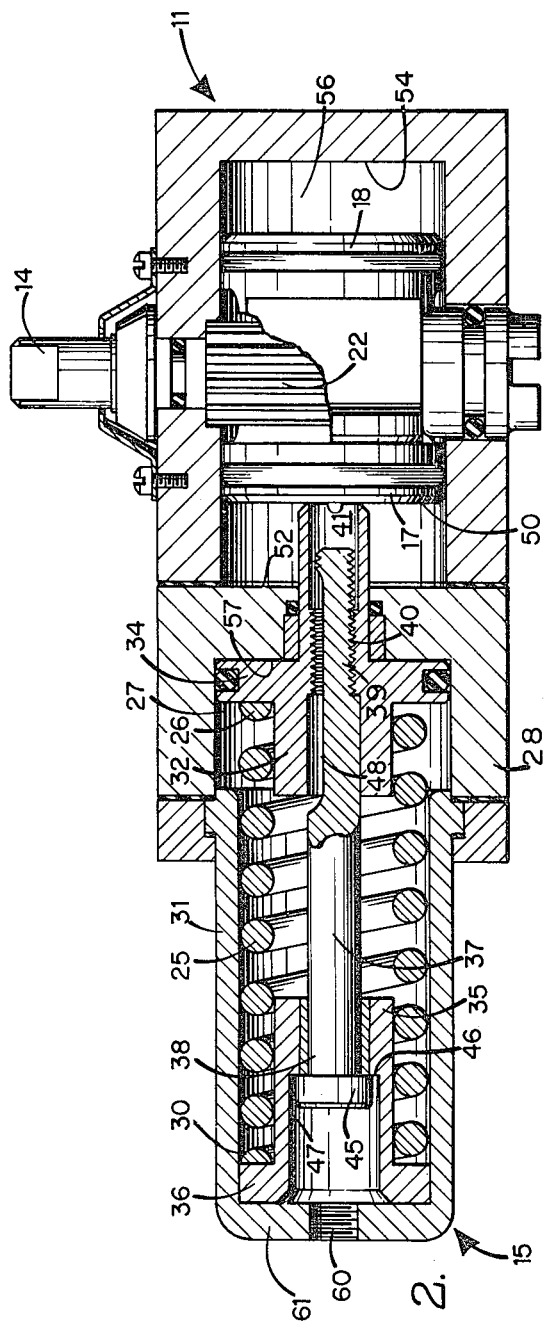
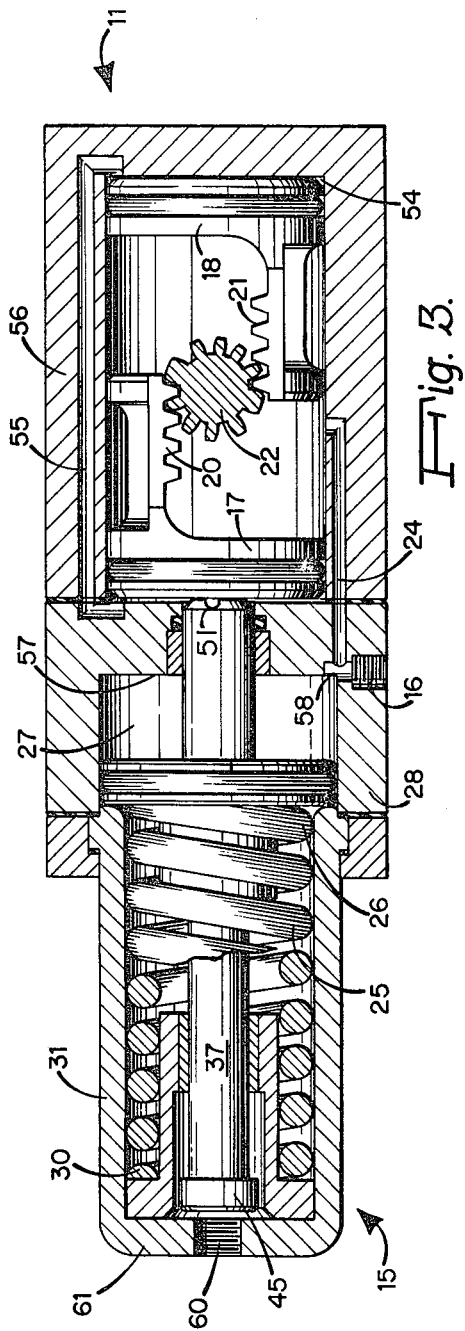
Fig. 2.
Fig. 3.

SPRING RETURN VALVE ACTUATOR

BACKGROUND OF THE INVENTION

1. Field of the Invention

The present invention relates to power actuated valves and in particular to a spring return actuator.

2. Description of the Prior Art

Our prior patent application, Power Actuated Valve, Ser. No. 708,698, filed July 26, 1976, now U.S. Pat. No. 4,046,350 describes power actuators as used with the spring return of the present invention. Power actuated valves lose operating power in cases of power failure or failure in the control mechanisms or connecting lines. In case of such failures it is desirable in some uses that the valve always fail open and in some other uses that the valve always fail closed. For these uses a spring return is commonly utilized with the power actuator. To insure adequate spring pressure through the entire stroke, these return springs are usually long and bulky. They require larger power actuators to offset the spring pressure on the forward stroke and they raise maintenance problems in tending to fly apart on disassembly. As used throughout this specification, "forward stroke" is defined as that operation of a valve actuator that compresses a coupled return spring.

SUMMARY OF THE INVENTION

Now, in accordance with the present invention, a spring return module is provided for a fluid pressure valve actuator in which the spring return module includes a piston for retracting the spring under the same fluid pressure driving the valve actuator. The spring is maintained under compression during assembly by a shaft passing through the piston and an air passage along the shaft provides an enclosed exhaust path to the valve actuator which may be utilized in corrosive environments.

Thus it is an object of the present invention to provide a novel spring return for power actuated valves.

Further objects and features of the present invention will become apparent upon reading the following description together with the drawing.

BRIEF DESCRIPTION OF THE DRAWING

FIG. 2 is a vertical section of a fluid powered actuator with spring return according to the invention;

FIG. 3 is a horizontal section of a fluid powered actuator with spring return according to the invention.

DESCRIPTION OF THE PREFERRED EMBODIMENT

Figure 1:
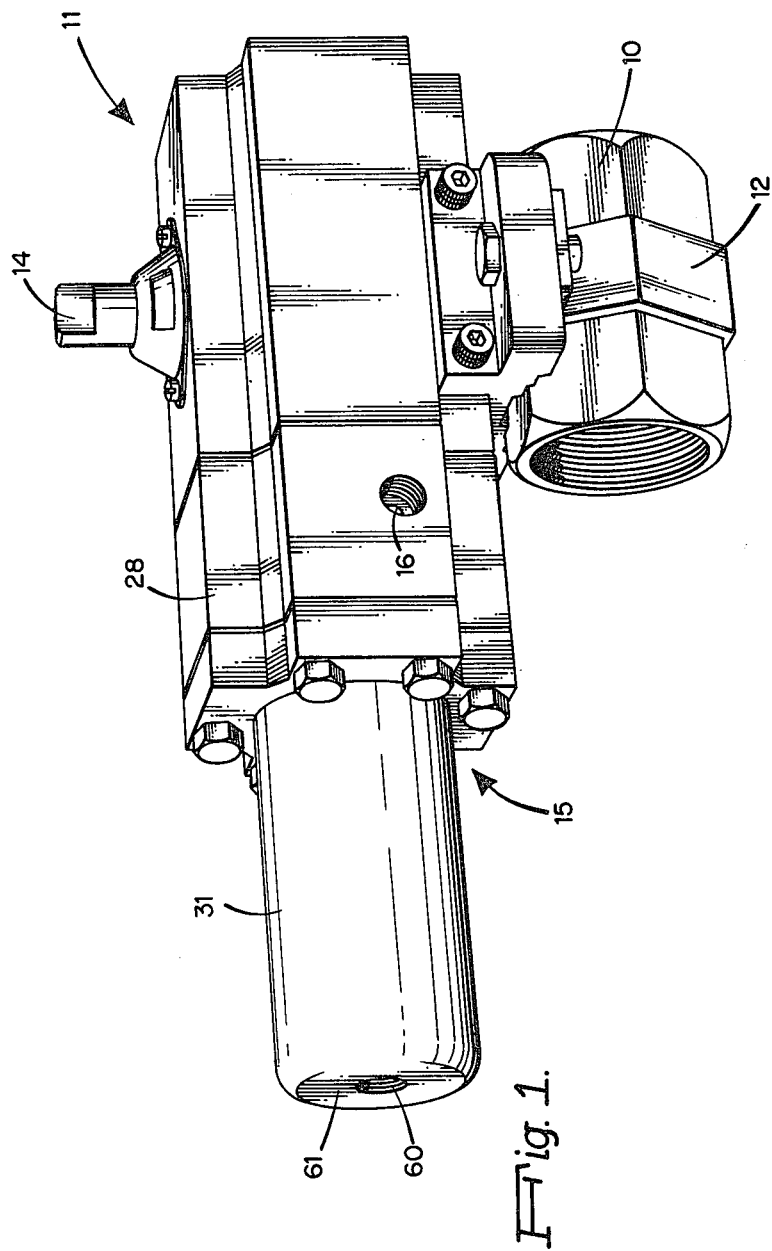
FIG. 1 is a perspective view of a valve assembly with spring return according to the invention.

Valve actuators according to the invention are most commonly used with 90° rotating valves. That is, valves such as ball valves, plug valves and butterfly valves that operate from full open to full closed by a 90° rotation of the valve stem. Thus the valve depicted only by valve body 10 in FIG. 1 is, by way of example, a ball valve. Valve actuator 11 is mounted to valve body 10 by mounting strap 12. Stem 14 projecting above the center of actuator 11 is connected to the stem (not shown) of the ball valve for rotating the ball manually if necessary. Spring return module 15 is bolted to actuator 11 in place of an end plate that is used when actuator 11 is driven both ways by fluid pressure. Fluid pressure connection 16 is provided in module 15 for operation of actuator 11 on the forward stroke. While hydraulic power may be used, actuator 11 is most commonly operated pneumatically.

Details of actuator 11 and spring module 15 are depicted in FIGS. 2 and 3. Actuator 11 is depicted with two driving pistons 17 and 18. As best depicted in FIG. 3, piston 17 and 18 each have a partial skirt with inward facing gear racks 20 and 21 respectively. Gear racks 20 and 21 mesh with and drive pinion 22 which is integral with stem 14. FIG. 2 depicts pistons 17, 18 retracted with pinion 22 in one position of rotation while FIG. 3 depicts pistons 17, 18 extended and pinion 22 rotated 90°. Drilled passageway 24 (FIG. 3) connects the interior of actuator 11 with connection 16 for application of fluid pressure to drive pistons 17, 18 on the forward stroke.

Spring module 15 has spring 25 with one end 26 disposed in cylinder 27 of block 28 and a second end 30 enclosed in housing 31. End 26 extends over skirt 32 of piston 34 positioned in cylinder 27. End 30 extends over skirt 35 of collar 36. Shaft 37 extends through spring 25 connecting piston 34 and collar 36.

First end 39 of shaft 37 carries a screw thread whereby it is threaded into aperture 40 in extended tube 41 connected to and integral with piston 34. Opposite end 38 of shaft 37 terminates in screwhead 45 having a slot or hexagonal recess (not shown) for tightening and loosening. Screwhead 45 bears against step 46 in stepped bore 47 of collar 36. Tightening shaft 37 pulls piston 34 and collar 36 together compressing spring 25. This precompressing of spring 25 facilitates assembly and disassembly.

Groove 48 provides a recess starting at end 39 and extending along shaft 37 acting as an air passage from tube 41 to the interior of housing 31. Tube 41, shaped as a hollow cylinder, bears against head 50 of piston 17. Notches 51 in tube 41 where it bears against head 50, permit ingress and egress of air to and from cylinder head 52 with the movement of pistons 17 and 18. Cylinder head 54 is connected to cylinder head 52 through passageway 55 bored in wall 56 of actuator 11.

Besides connecting to passageway 24, connection 16 also connects to head 57 of cylinder 27. In the depicted embodiment this connection is made by small aperture 58 directly between connection 16 and head 57.

Block 28 sealingly connects to actuator 11 at head 52 by means of machine screws. Block 28 is directly interchangeable with a plate containing fittings to provide fluid pressure to actuator 11 for fluid pressure operation in both directions.

Housing 31 mounts in sealing engagement with block 28 and may also be secured by machine screws. Aperture 60 in end 61 of housing 31 is provided for ingress and egress of air (or other gas) flow produced by the motion of pistons 17, 18 and 34. For valves that are to be operated in corrosive atmospheres, aperture 60 is connected to a closed system or to a location where the atmosphere is not deleterious. To this end, actuator 11 and return spring module 15 are air tight other than for aperture 60 and connection 16.

While the present invention has been described with relation to a specific embodiment, it is not intended to be limited thereto. For example, the valve actuator may be single or double piston and the pistons may drive a valve by levers as well as gears. Also, while a single spring element has been described, a plurality of springs mounted concentrically or side-by-side can be utilized without departing from the inventive concept. Thus it is the intention to cover the invention as set forth within the full scope of the following claims.

We claim:

1. In a power-actuated valve assembly having a fluid-powered actuator piston for rotating a valve in a first direction and a spring mechanism for rotating said valve in the opposite direction, the combination in said spring mechanism comprising:
   (a) a tube bearing against said actuator piston;
   (b) a spring piston connected to said tube;
   (c) a cylinder block enclosing said spring piston;
   (d) a spring bearing against said spring piston forcing said tube against said actuator piston;
   (e) a housing enclosing said spring and coupled to said cylinder block;
   (f) fluid connections to both said actuator piston and said spring piston whereby when fluid power is applied to drive said valve in said first direction it is also applied against said spring piston to drive said spring into compression; and,
   (g) an aperture in said housing for a fluid connection and passageways into said housing including an aperture through said tube for relieving back pressure from said actuator piston and said spring piston.

2. In a power-actuated valve assembly having a fluid-powered actuator piston for rotating a valve in a first direction and a spring mechanism for rotating said valve in the opposite direction, the combination in said spring mechanism comprising:
   (a) a tube bearing against said actuator piston;
   (b) a spring piston connected to said tube;
   (c) a cylinder block enclosing said spring piston;
   (d) a helical compression spring bearing against said spring piston forcing said tube against said actuator piston, said spring having a first end captive over the skirt of said spring piston, a second end captive over skirt of a collar, said collar and said piston being connected by a shaft which is threaded into one of said piston and said collar whereby said spring may be precompressed by rotation of said shaft; and,
   (e) fluid connections to both said actuator piston and said spring piston whereby when fluid power is applied to drive said valve in said first direction it is also applied against said spring piston to drive said spring into compression.

3. The combination according to claim 2 wherein said shaft has a groove along its threaded portion for fluid passage.

4. A power actuated ball valve with spring return comprising:
   (a) a ball valve;
   (b) a fluid power actuator coupled to said ball valve comprising:
      (1) an actuator body enclosing two opposed cylinders;
      (2) a stem carrying longitudinally arranged gear teeth mounted between said two cylinders for rotation in said body;
      (3) first and second opposed pistons each having a partial skirt with an internal gear rack meshing with said gear teeth, said pistons arranged to reciprocate within said body;
      (4) a first passage in a wall of said body connecting outside ends of said two cylinders;
      (5) a second passage in a wall of said body connecting the interior of said body to one end of said body; and,
   (c) a spring return assembly mounted to said one end of said body and including a spring, a fluid actuated piston coupled to said spring located in a cylinder connected both to an external fluid power connection and to said second passage whereby applied fluid pressure can be utilized simultaneously for driving said spring into compression and actuating said ball valve.

* * * * *